United States Patent [19]

AuClair et al.

[11] 4,299,903
[45] Nov. 10, 1981

[54] EMULSION POLYMERIZATION PROCESS FOR DRY POSITIVE TONER COMPOSITIONS EMPLOYS CHARGE CONTROL AGENT AS WETTING AGENT

[75] Inventors: Christopher J. AuClair, Fairport; Chin H. Lu, Webster, both of N.Y.

[73] Assignee: Xerox Corporation, Stamford, Conn.

[21] Appl. No.: 165,582

[22] Filed: Jul. 3, 1980

[51] Int. Cl.³ .............................................. G03G 9/10
[52] U.S. Cl. .................................... 430/137; 430/109; 430/110; 430/528; 260/DIG. 20; 260/42.54
[58] Field of Search ....................... 430/137, 109, 110; 260/DIG. 20

[56] References Cited

U.S. PATENT DOCUMENTS

| | | | |
|---|---|---|---|
| 3,060,020 | 10/1962 | Greig | 430/107 |
| 3,391,082 | 7/1968 | Maclay | 430/137 X |
| 3,669,922 | 6/1972 | Bartsch | 430/137 |
| 3,775,357 | 11/1973 | Nemeth | 260/17 A |
| 4,019,933 | 4/1977 | Tamai et al. | 430/137 |
| 4,077,804 | 3/1978 | Vanzo | 430/137 |
| 4,148,741 | 4/1979 | Bayley | 260/42.14 X |

*Primary Examiner*—John D. Welsh
*Attorney, Agent, or Firm*—E. O. Palazzo

[57] ABSTRACT

This invention relates to a process for the preparation of dry positively charged toner particles, and more spceifically a polymerization process for preparing dry positively charged toner resins, containing a charge control agent, or additive which has a dual function, as a wetting agent in the polymerization process, and as a charge control agent for the toner resin, whereby the charge control agent is firmly bonded (attached) to the toner resin and is uniformly dispersed in the resin, or emulsion polymerization of a monomer material, a pigment and a charge control additive. As a result of the polymerization there is formed a dry positively charged toner resin which has attached thereto the charge control agent.

3 Claims, No Drawings

EMULSION POLYMERIZATION PROCESS FOR DRY POSITIVE TONER COMPOSITIONS EMPLOYS CHARGE CONTROL AGENT AS WETTING AGENT

BACKGROUND OF THE INVENTION

This invention is generally directed to a process for preparing toner resins, and more specifically, a polymerization process for preparing toner resins containing positive charges thereon, which resins may be useful as a component in a developer composition for developing images in various electrophotographic imaging systems.

The formation and development of images on the surface of photoresponsive members is well known as documented in many prior art patents. The latent image that is formed on the photoresponsive device is usually developed by applying electroscopic or toner materials to the surface followed by transfer of the developed latent image to a suitable substrate and optionally permanently affixing the transferred image to the substrate.

Many methods have been described in the literature for preparing toners including suspension polymerization, emulsion polymerization, dispersion polymerization and the like. In one method the softened resin and pigment are mixed thereby resulting in a uniform dispersion by blending these ingredients in a rubber mill, and then pulverizing the materials in order to form them into small particles. Division of the resin pigment dispersions is accomplished by jet pulverization of the material, and although this technique of toner manufacture has resulted in very excellent toners, it does tend to have certain disadvantages including for example it generally produces a rather wide range of toner particle sizes.

In another method of forming toner particles, there is employed the spray drying technique wherein there is blended a water latex of the desired toner resin with a colorant, followed by spray drying the mixture to the desired particle size. More specifically, the spray drying method consists essentially of atomizing the colorant water latex blend into small droplets, mixing these with a gas and retaining the droplets in suspension in the gas until surface tension forces cause the resin particles in each droplet to coalesce, thus encasing the colorant included in that droplet. In some instances spray dryed toners are not totally satisfactory as it is difficult to completely remove all the solvent, and the solvent which remains on the toner particles adversely effects the triboelectric properties between the toner and carrier, and contributes to the blocking of the toner when such is used in the developing processes.

There is described in U.K. Patent Publication 1,319,815 a process for preparing toners directly from monomers by polymerization of the monomer in toner sized particles containing a colorant. A method of suspension polymerization for causing the formation of toner particles is disclosed in U.S. Pat. No. 3,634,251. In the method as described in the British patent, there is prepared a kneaded oil phase component of one or more liquid resin monomers, coloring material, the polymerization initiator, and a finely divided inorganic dispersion stabilizer, such as a metal powder or inorganic salt or oxide, and a polar resinous additive which is soluble in the monomer. Subsequent to suspension polymerization of the monomer, if required, the finely divided dispersion stabilizer is removed by dissolution in an acid and the polymer particles are removed from the aqueous phase and dryed to produce toner. There are some disadvantages associated with this process including the requirement of a high ratio of inorganic stabilizer, which needs to be removed as it will affect the properties of the toner, and thus the quality of the resulting image to be developed.

There have also been proposed suspension polymerization processes similar to the ones described herein but wherein the use of an inorganic stabilizer is eliminated. Generally this process is accomplished by mixing a monomer, a colorant, and an initiator to form an oil soluble organic phase, dispersing this oil soluble phase in controlled a size between 5 to about 20 microns in a water phase, employing the suspending agent such as polyvinyl alcohol, polymerizing, employing conventional suspension polymerization techniques, followed by introduction of a second monomer which is allowed to defuse into the first monomer, and consequently swells the polymer, introducing a water soluble initiator and heating this reaction to effect polymerization of the second monomer and to form the toner.

One method for preparing toners containing positive charges involves the melt blending of a pigment, a charge control agent, and a resin followed by mechanical attrition. Toners prepared by such methods have some disadvantages including incompatibility of the charge control agent, such as a quaternary ammonium compound, or an amine, with the resin thereby the charge control agent is difficult to uniformly disperse in the toner resulting in particle to particle non-uniformity and a wide range of charge distribution. Further, since the charge control agent may be poorly mixed with the resin, the charge control agent may preferentially transfer or leach to the carrier surface thus shortening developer life. Also, the toner resin prepared by suspension or emulsion polymerization usually contains substantial amounts of the residual wetting agent and stabilizing agent, which seriously affects the triboelectric properties and stability of the developers.

SUMMARY OF THE INVENTION

It is therefore an object of this invention to provide a toner which overcomes the above-noted disadvantages.

It is a further object of the present invention to provide a process for preparing toner resins wherein a charge control agent is molecularly dispersed in and firmly bonded to the resin while at the same time functioning as a wetting agent.

An additional object of the present invention is to provide a process for preparing dry positive toners, which have improved particle-to-particle uniformity, a narrow charge distribution, and which process results in reduction of leaching of the charge control agent from the toner resin to the carrier surface.

These and other objects of the present invention are accomplished by providing a process for the preparation of dry positively charged toner particles, and more specifically a polymerization process for preparing dry positively charged toner resins, containing a charge control agent, or additive which has a dual function, as a wetting agent in the polymerization process, and as a charge control agent for the toner resin, whereby the charge control agent is firmly bonded (attached) to the toner resin and is uniformly dispersed in the resin. More specifically, the process of the present invention involves the suspension or emulsion polymerization of a monomer material, a pigment and a charge control additive. As a result of the polymerization there is formed a dry positively charged toner resin which has attached thereto the charge control agent. The polymerization process involves suspension or emulsion polymerization, generally known in the art, and as described for example in the prior art referred to herein.

Numerous different types of charge control agents can be used in the process of the present invention, including for example long chain quaternary ammonium compounds, alkyl pyridinium compounds, long chain amide compounds, and the like.

Illustrative examples of quaternary ammonium compounds useful in the process of the present invention include those of the following formula:

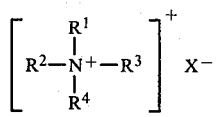

wherein $R^1$, $R^2$, $R^3$ and $R^4$ are independently selected from alkyl radicals, subject to the provision that at least two of the R radicals are alkyl radicals containing from about 12 carbon atoms to about 22 carbon atoms, and preferably from 14 carbon atoms to about 18 carbon atoms, and X is an anion such as halide, sulfate, sulfonate, nitrate, phosphate, borate, or nitrate.

Illustrative examples of alkyl radicals include methyl, ethyl, propyl, butyl, hexyl, heptyl, nonyl, octyl, decyl, myristyl, cetyl, olely, stearyl, pentadecyl, heptadecyl, benzyl, phenyl, and the like. Specific illustrative examples of quaternary ammonium compounds that may be useful in the process of the present invention include for example stearyl benzyl dimethyl ammonium chloride, cetyl benzyl dimethyl ammonium chloride, distearyl dimethyl ammonium chloride, stearyl butyl dimethyl ammonium bromide, and myristyl benzyl dimethyl ammonium methyl sulfate.

Also useful in the present invention as the dual functioning wetting agent, and charge control agent are alkyl pyridinium compounds or their corresponding hydrates of the formula:

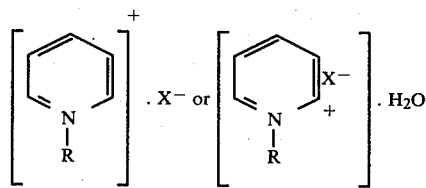

wherein R is a alkyl radical containing from about 12 carbon atoms to about 22 carbon atoms, and preferably from about 12 carbon atoms to about 18 carbon atoms, X is an anion which in a preferred embodiment is selected from halides such as fluoride, chloride, bromide or iodide, sulfate, sulfonate, nitrogen, borate, and phosphate.

Specific illustrative examples of alkyl pyridinium compounds useful in the process of the present invention include cetyl pyridinium chloride, heptadecyl pyridinium bromide, heptadecyl pyridinium tolsylate myristyl pyridinium chloride, and the like, with cetyl pyridinium chloride being preferred.

Illustrative examples of amines that may be used in the process of the present invention include those of the following formula

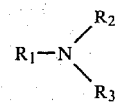

wherein $R_1$ is an alkyl radical containing from about 12 carbon atoms, to about 22 carbon atoms, and $R_2$ and $R_3$ are independently selected from the group consisting of hydrogen and hydrocarbon radicals, such as alkyl radicals. Examples of alkyl radicals are provided herein with reference to the quaternary ammonium compounds.

The dual functioning charge control-wetting agent material used in the process of the present invention are present in any amount that would not adversely affect the system, and that results in a toner that is positively charged in comparison with the carrier. In one important embodiment the amount of material present ranges from about 0.1 percent to about 10 weight percent, and preferably from about 1 weight percent to about 5 weight percent of the total toner weight.

Monomer materials useful in the process of the present invention include for example, styrene, p-chlorostyrene, vinyl naphthalene, vinyl esters such as vinyl acetate, vinyl propionate, vinyl benzoate, vinyl butyrate, and the like, butadiene, n-butylmethacrylate, isobutylmethacrylate, dodecyl acrylate, octyl arcylate, 2-chloro ethyl acrylate, phenol acrylate, methyl alpha chloroacrylate, ethyl methacrylate, and other esters of alpha methylene aliphatic monocarboxylic acid, acrylonitrile, methacrylonitrile, vinylidene chloride and mixtures thereof.

Various different colorants or pigments may be used in the process of the present invention including for example carbon black, iron oxides, nigrosine, gilsonite, and the like, with carbon black being preferred.

The colorant or pigment is present in amounts of from about 1 percent by weight to about 50 percent by weight and preferably from about 5 percent by weight to about 10 percent by weight, with the resin being present in an amount of from about 98 percent by weight to about 40 percent by weight, and preferably from about 85 percent by weight to about 95 percent by weight.

The resulting toner, polymerized monomer plus pigment, and charge control agent can then be mixed with a suitable carrier material for the purpose of forming a developer mixture, which developer mixture contains a positively charged toner resin, and is useful for developing images in an electrostatographic imaging system. Any suitable carrier material can be used providing that such material is capable of triboelectrically obtaining a charge of opposite polarity to that of the toner particles. In the present invention that would be a negative polarity. Thus, the toner particles which are positively charged will adhere to and surround the carrier particles. Examples of carrier materials include sodium chloride, ammonium chloride, ammonium potassium chloride, Rochelle salt, sodium nitrate, aluminum nitrate, potassium chlorate, granular zircon, granular silicon, methyl methacrylate, glass, steel, nickel, iron ferrites, silicon dioxide, and the like, with metallic carriers especially magnetic carriers being preferred. The carriers can be used with or without a coating such coatings generally containing polyvinylidene fluoride resins, but other resins especially those which charge negatively such as polystyrene, halogen containing ethylenes and the like, can be employed. Also nickel berry carriers as described in U.S. Pat. No. 3,847,604 and 3,767,598 can be employed, these carriers being modular carrier beads of nickel characterized by surfaces of reoccurring recesses and protrusions providing particles with a relatively large external area. The diameter of the coated carrier particles from about 50 to about 1,000 microns thus allowing the carrier to possess sufficient density and inertia to avoid adherence to the electrostatic images during the development process.

The preferred carrier material is comprised of a steel core coated with a polyvinylidene fluoride resin.

The carrier may be employed with the toner composition in any suitable combination, however, best results are obtained when about 0.5 parts to about 10 parts of toner to 100 to 200 parts by weight of carrier, and preferably about 1 part to 5 parts to toner to 100 parts by weight of carrier are present.

Developer compositions of the present invention may be used to develop images on any suitable electrostatic surface capable of retaining charge including conventional photoconductors however, the developers of the present invention are best utilized in the systems wherein negative charges reside on the photoreceptor and this usually occurs with organic photoreceptors. Illustrative examples of organic photoreceptors include polyvinylcarbazole, 4-dimethylamino benzodine, benzhydrazide, 2-benzylideneamino-carbazole, 4-diemthyl amino-benzyldine, benzhydrazide, 2-benzylideneamino-carbazole, polyvinyl carbazole, 2-nitro-benzylidene-p-bromoaniline, 2,4-diphenol quinazoline, 1,2,4-traizine, 1,5-diphenyl-3-methyl pyrazoline, 2-4'-dimethyl amino phenyl, benzoxazole, 3-amino carbazole, polyvinyl carbazole-trinitrofluorenone charge transfer complexes, phthalocyanines, layered photoreceptors and mixtures thereof.

By following the process of the present invention the charge control agent is molecularly dispersed in the resin and becomes permanently attached to each toner particle. Such attachment can be in the form of a coating or film. The entire toner particle need not be coated with the charge control agent, thus for example, part of the structure of the charge control agent can be embedded in the toner surface while another part is contained on the surface thereof.

Generally emulsion and suspension polymerization involve the following:

In emulsion polymerization there is combined monomers (oil phase) with water containing surfactants (soaps), polymerization initiator, and chain modifiers. These materials are mixed resulting in the formation of an emulsification. The resulting continuous phase is heated at the proper temperature, and for an appropriate period of time, thus resulting in a polymer latex material within the surfactant encased micelles, which is subsequently coagulated, filtered and dried.

Suspension polymerization differs from emulsion polymerization in that the monomer oil phase is not miscellized by the soap. The oil phase is suspended as beads (20-40 u) by the addition of fine powders such as talc, clay or calcium salts. These salts suround the oil phase and prevent the oil beads from sticking to each other. The purpose of the soap is to allow the water to "wet" the powders used to stabilize the beads. The polymerization (bulk polymerization) occurs in the beads of oil.

Any catalyst or initiator which is compatible with the particular monomer being used may be utilized in the process of the invention. Typical of initiators for polymerization are the peroxide and azo initiators. Among those found suitable for use in the suspension polymerization process of the present invention are azobis(2methylpropionitrile)lauropyl peroxide, and the like, which result in complete polymerization without leaving detrimental residual materials or requiring high temperatures or pressures. A typical emulsion polymerization initiator is potassium persulfate and the like.

Generally, the initiator is used in an amount necessary to achieve complete polymerization without waste of the initiator. An amount of about 2 percent up to about 10 percent by weight initiator to monomer has been found to be suitable. A preferred range is about 2 to about 5 percent by weight of initiator to monomer, which results in complete polymerization without waste. The optimum amount in the instance of lauroyl peroxide with styrene monomer systems is about 2 percent as this gives complete polymerization at low cost, and results in good toner properties.

The invention will now be described in detail with respect to specific preferred embodiments thereof, it being understood that these examples are intended to be illustrative only and the invention is not limited to the materials, conditions, and process parameters recited herein. All parts and percentages are by weight unless otherwise indicated.

EXAMPLE I

I. A Typical Emulsion Polymerization Technique

One method of accomplishing emulsion polymerization involves the following process steps:

In an 8 ounce pressure bottle, there was added the following ingredients; 45 milliliters of distilled water, 0.3 grams of dodecyl mercaptan, a chain stopping agent, (controls the amount of polymerization), 0.09 grams of potassium persulfate, the initiator, and 3 grams of sodium lauryl sulfate used as the stabilizing material for the emulsion. In the process of the present invention, a long chain quaternary ammonium salt was substituted for the sodium lauryl phosphate.

To the above mixture was added 30 grams of monomers consisting of styrene and butadiene, with the butadiene content ranging from about 5 to 50 percent, and the styrene content ranging from about 95 to 50 percent. The bottle was then capped and maintained at 50° C. for 7 to 12 hours, the amount of time depending on the monomer ratio. The polymer latex was cooled slowly and the bottle is then opened. The residual monomers are steam distilled off and the latex coagulated by pouring it into a Waring blender containing 100 milliliters of 2-propanol. The coagulation is filtered, washed with water and dryed in order to obtain the desired polymeric material, a styrene butadiene copolymer resin.

EXAMPLE II 660 grams of a monomer mixture containing 65 percent styrene and 35 percent n-butyl methacrylate, 2 percent of the initiator azo bis(2-methyl propionitrile), AIBN, and 1 percent of cetyl benzyl dimethyl ammonium chloride, (charge control additive) was prepared by emulsion polymerization. This mixture was added dropwise into three liters of water maintained at a temperature of 90° C., which water contained 0.02 percent of Cetol[R], cetyl benzyl dimethyl ammonium chloride being used as a wetting agent and 3 percent of tricalcium phosphate suspending agent. This mixture was stirred and after about 6 hours the polymerization was stopped and the mixture was allowed to cool. 80 milliliters of concentrated nitric acid was then added to the mixture to dissolve the tricalcium phosphate, and the resulting polymer was filtered and washed several times with distilled water to remove all the undesirable acid. The dryed resin which was comprised of a styrene/n-butyl methacrylate copolymer and the dispersed charge control agent cetol benzyl dimethyl ammonium chloride was fabricated into a toner by melt blending 94 parts of the resin product and 6 parts of Regal 330 carbon black followed by mechanical attrition.

A developer mixture was prepared by mixing the toner with a carrier comprised of a Hoeganese steel core coated with a 0.15 percent Kynar 301 vinylidene fluoride resin available from Pennwalt Corporation, and after testing in a Faraday Cage, the developer mixture had a triboelectric charge of +33 microcoulombs per gram after 1 minute, +29 after 10 minutes, +21 after 1 hour, and a +19 after 4 hours of mixing, which charge remains stable over a period of 24 hours. This indicates that the Cetol[R] was uniformly dispersed in the resin, and no additional charge control additive is required. At the end of 24 hours, the developer triboelectric charge was a +15 microcoulombs per gram. Such stability indicates good dispersion and little or no transfer of charge control agent to the carrier. In addition, this demonstrates a polymerication process without employing harmful surfactants. Also, the process requires no post addition of charge control additives to the resulting toner before toner fabrication.

EXAMPLE III

A suspension polymerization was carried out using 65 percent styrene and 35 percent n-butyl methacrylate. A 5 liter resin kettle was charged with 3 liters of distilled water containing 48 grams tricalcium phosphate as suspending agent and 0.6 grams cetyl benzyl dimethyl ammonium chloride (Cetol[R]) commercially available from Hexcel Company as a surfactant to wet the tricalcium phosphat, and as a charge inducing additive. The water was heated to 75° C. A mixture of 1040 grams styrene and 560 grams n-butyl methacrylate (both inhibitor free) was prepared containing 32 grams (or 2 percent) of azobisisobutyrlnitrile initiator and 16 grams Cetol[R] (heating to 30° C. to facilitate dissolution of the Cetol.) The monomer mixture was added dropwise into the water phase described above with stirring. The polymerization was carried out for 6 hours. 100 milliliters of concentrated acid was added to the cooled suspension to dissolve the tricalcium phosphate and the copolymer resin of styrene 65%, and 35% n-butyl methacrylate, was isolated by filtering, washed free of acid with distilled water and dried. 94 parts of the above copolymer resin, 6 parts Regal 330 carbon black was fabricated by melt blending followed by mechanical attrition. When mixed with Hoeganaes steel carrier coated with 0.15 percent Kynar at 301° F., the following triboelectric values were obtained:

| Time | Tribo Charge Microcoulombs per gram |
|---|---|
| 1 min. | +33 |
| 10 min. | +29 |
| 60 min. | +21 |
| 4 hrs. | +19 |
| 24 hrs. | +15 |

The high positive tribo indicates that Cetol[R] was uniformly dispersed in the resin, and no additional charge control additive is required.

EXAMPLE IV

An emulsion polymerization was accomplished as follows:

200 parts of water containing 2 parts distearyl dimethyl ammonium chloride, charge inducing material, and wetting agent, and 0.5 parts potassium persulfate (initiator) were mixed. The monomer phase contained 95 parts styrene, 5 parts 1,3-butadiene and 0.5 parts dodecyl thiol (as chain length modifier). 150 milliliters, total volume of the above was charged into an 8 ounce pressure bottle, capped and placed in a shaker at 50° C. for 12 hours. The resultant latex was coagulated with 100 milliliters by volume of ethyl alcohol. Toner, 94 parts resin of the above resin of styrene and butadiene, 6 parts Regal 330 carbon black was fabricated and resulted in the following triboelectric values when mixed with 0.15 percent Kynar at 301° F. coated Hoeganaes steel carrier:

| Time | Tribo Charge Microcoulombs per gram |
|---|---|
| 1 min. | +19 |
| 10 min. | +15 |
| 60 min. | +15 |
| 24 hrs. | +10 |

EXAMPLE V

A suspension polymerization was accomplished in the same manner of Example I using 928 grams styrene and 672 grams of n-butyl methacrylate, (58%/42%), 48 grams tricalcium phosphate and 0.6 grams Cetol[R] in the water phase, and 16 grams in the monomer phase. Toner prepared from the resulting resin, against the carrier of Example I gave the following triboelectric values:

| Time | Tribo Charge Microcoulombs per gram |
|---|---|
| 1 min. | +25 |
| 10 min. | +20 |
| 60 min. | +17 |
| 4 hrs. | +15 |
| 24 hrs. | +12 |

EXAMPLE VI

The procedure of Example I was repeated with the exception that the amount of potassium persulfate used was 1.0 percent and the monomer of styrene/n-butyl methacrylate contained 80 percent styrene and 20 percent butadiene. Substantially similar results, including tribo charge (positive), were obtained.

EXAMPLE VII

The materials as produced by the process outlined in Examples II–VI when used in a developer mixture for developing latent electrostatic images produced images of excellent quality and excellent resolution. Such developers possessed a positive charge for causing the development of latent electrostatic images on a photoreceptor such as polyvinyl carbazole which was charged negatively. Copy quality and resolution remained high after 10,000 copies were made.

Other modifications of the present invention will occur to those skilled in the art upon reading of the present invention. These are intended to be included within the scope of this invention.

What is claimed is:

1. A process for preparing dry positively charged toner particles which comprises subjecting to an emulsion polymerization, or suspension polymerization in the absence of a surfactant, a toner resin and colorant, the resin being a styrene/n-butyl methacrylate copolymer, or a styrene butadiene copolymer, carbon black, and a charge control agent present in the amount of from 0.1% to about 10 weight %, the charge control agent being selected from cetyl benzyl dimethyl ammonium chloride, distearyl dimethyl ammonium chloride or cetyl pyridinium chloride, which charge control agent functions as a wetting agent in the polymerization process, and as a charge control agent for the toner resin, said charge control agent being permanently attached to the toner resin and uniformily dispersed in said resin thereby resulting in a toner composition having a positive uniform triboelectrostatic charge over a substantial period of time, improved particle to particle uniformity, a narrow charge distribution, and the substantial elimination of the leaching of the charge control agent from the toner resin the reaction being accomplished at a temperature of at least 50° C.

2. A process in accordance with claim 1 wherein the resin is a styrene/n-butyl methacrylate resin, containing 65% by weight of styrene and 35% by weight of n-butyl methacrylate, or a styrene butadiene resin containing 90 percent by weight of styrene and 5 percent by weight of butadiene, the carbon black is Regal 330, and the polymerization process is accomplished at 50° C.

3. A process in accordance with claim 1 wherein there is prepared a developer composition which comprises adding thereto a carrier material comprised of a core consisting of steel coated with a vinylidine fluoride resin thereby resulting in a positive charge on the toner resin ranging from 15 microcoulombs per gram to 33 microcoulombs per gram during a period of from 1 minute to 24 hours.

* * * * *